June 15, 1926.  R. RICHTER  1,588,612
PHOTOGRAPHIC TRIPLET
Filed Jan. 7, 1926
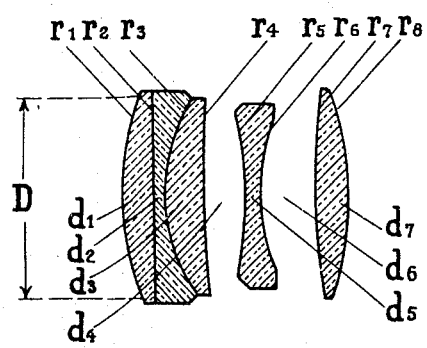
| | | | |
|---|---|---|---|
| $r_1 = + 45.0$ | $d_1 = 6.0$ | $n_D = 1.62140$ | $n_{G'} = 1.63503$ |
| $r_2 = \infty$ | $d_2 = 2.0$ | $n_D = 1.52320$ | $n_{G'} = 1.53626$ |
| $r_3 = + 30.0$ | $d_3 = 7.0$ | $n_D = 1.62140$ | $n_{G'} = 1.63503$ |
| $r_4 = + 362.43$ | $d_4 = 8.0$ | | |
| $r_5 = - 70.0$ | $d_5 = 2.5$ | $n_D = 1.61300$ | $n_{G'} = 1.63496$ |
| $r_6 = + 38.5$ | $d_6 = 10.3$ | | |
| $r_7 = + 125.0$ | $d_7 = 6.0$ | $n_D = 1.62140$ | $n_{G'} = 1.63503$ |
| $r_8 = - 52.34$ | | | |
Inventor:
Robert Richter Patented June 15, 1926.

1,588,612

UNITED STATES PATENT OFFICE.

ROBERT RICHTER, OF BERLIN-FRIEDENAU, GERMANY, ASSIGNOR TO OPTISCHE ANSTALT C. P. GOERZ AKTIENGESELLSCHAFT IN GOERZALLEE, BERLIN-ZEHLEN-DORF, GERMANY.

PHOTOGRAPHIC TRIPLET.

Application filed January 7, 1926, Serial No. 79,844, and in Germany February 12, 1925.

Objectives now on the market having three lenses separated by air spaces and known as photographic triplets form well-corrected images, but the angular extent of the field is limited to about 40° at an aperture ratio of about 1:3. In these lenses luminosity has been considerably increased without accentuating spherical aberration by doubling the front collective lenses. The disadvantage involved in this step however is to increase by two the number of glass-air surfaces.

This invention relates to a modification of the ordinary triplet lens in which the angular extent of the field is as large as 50° while spherical aberration is simultaneously lower. Moreover luminosity remains satisfactory and the number of glass-air surfaces is not increased. This is obtained in the new objective by filling with glass of low refractive index the air space between the collective lenses forming the front collective component of an ordinary triplet. The filling of this space acts as favourably as air in respect of spherical aberration and has the further advantage of reducing the curvature of the focal surface with the result that it becomes possible to increase the angular extent of the field while spherical aberration is small.

The best results are obtained by shaping the two collective lenses of the front component so that the front surfaces have a greater curvature than the rear surfaces, as is customary in objectives having four separate lenses.

The low-refraction dispersive lens may be made of flint glass so that it may co-operate in chromatic correction.

A construction of the new objective having a focal length of F=100 and an effective aperture of D=37.0 is illustrated in the accompanying drawing. The data for this object-glass are given in the following table in which the figures for $r^1$, $r^2$ etc. are the length of radii of curvature for the surfaces indicated by the said reference letters, while the figures for $d^1$, $d^2$ etc. are the thickness (i. e. the vertex distances between the surfaces) of the glass and air lenses indicated by the last-mentioned reference letters. The various qualities of glass are quoted from the catalogue of the Sendlinger Optische Glaswerke G. m. b. H. of Berlin-Zehlendorf.

| Radii. | Apex distances. | Nature of glass. |
|---|---|---|
| $r^1$=+45.0 | $d^1$=6.0 | Barion, 621/581. |
| $r^2$=∞ | $d^2$=2.0 | Telescope flint, 523/513. |
| $r^3$=+30.0 | $d^3$=7.0 | Barion, 621/581. |
| $r^4$=+362.43 | $d^4$=8.0 | Air. |
| $r^5$=−70.0 | $d^5$=2.5 | Flint, 613/369. |
| $r^6$=+38.5 | $d^6$=10.3 | Air. |
| $r^7$=+125.0 | $d^7$=6.0 | Barion, 621/581. |
| $r^8$=−52.34 | | |

The refractive indices of the above-mentioned glasses for the lines D and G' are as follows:

Barion............................ 621/581 $n_D$=1.6214 $n_{G'}$=1.63503
Telescope flint................. 523/513 $n_D$=1.5232 $n_{G'}$=1.53626
Flint.............................. 613/369 $n_D$=1.6130 $n_{G'}$=1.63496

What I claim is:—

1. A spherically, chromatically and astigmatically corrected photographic objective free from distortion having three components separated by air spaces, of which the central component is a single bi-concave lens and the rear component a single bi-convex lens, whereas the front component which is of collective nature, is made of three cemented lenses, the two outer lenses being collective and the inner one dispersive and made of glass the refractive index of which is lower than the refractive index of the two collective lenses surrounding it.

2. A spherically, chromatically and astigmatically corrected photographic objective free from distortion having three components separated by air spaces, of which the central component is a single bi-concave lens and the rear component a single bi-convex lens, whereas the front component which is of collective nature, is made of three cemented lenses, the two outer lenses being collective and having a greater curvature on the front side than on the field side and the inner one dispersive, and made of glass the refractive index of which is lower than the refractive index of the two collective lenses surrounding it.

In testimony whereof I have signed my name to this specification.

ROBERT RICHTER.